United States Patent [19]
Pierret et al.

[11] Patent Number: 5,294,881
[45] Date of Patent: Mar. 15, 1994

[54] CIRCUIT FOR DETECTING THE STATE OF A SWITCH, IN PARTICULAR A CAR KEY CONTACT IN A VOLTAGE REGULATOR OF AN ALTERNATOR

[75] Inventors: Jean-Marie Pierret, Paris; Didier Canitrot, Saint-Maur des Fosses, France

[73] Assignee: Valeo Equipements Electriques Moteur, Creteil, France

[21] Appl. No.: 849,296

[22] Filed: Mar. 10, 1992

[30] Foreign Application Priority Data

Mar. 12, 1991 [FR] France .................. 91 02959

[51] Int. Cl.⁵ ............................ H02J 7/14; H02J 9/06
[52] U.S. Cl. ............................... 322/28; 322/99
[58] Field of Search ................... 320/64; 322/28, 99

[56] References Cited
U.S. PATENT DOCUMENTS 4,056,765 11/1977 Scheidler et al. ............... 322/99 X
4,488,105 12/1984 Papazian ........................... 320/64

*Primary Examiner*—R. J. Hickey

[57] ABSTRACT

A circuit for detecting the state of a switch, in particular the state of a key contact for activating a regulator circuit for regulating the voltage at which a battery is charged by an alternator, in which a first terminal of the key switch is connected to a DC source and a second terminal of the key switch is connected to the regulator circuit via a load such as a warning lamp, said load being switched ON and OFF by means of a component having a voltage drop. The detection circuit is wherein it comprises amplifier means receiving a reference voltage on a first terminal, and on a second terminal the voltage present on a terminal of the load opposite from its terminal connected to the key switch, the amplifier means being designed to regulate the voltage drop to the value of the reference voltage so long as the key switch and the component having the voltage drop are conductive, and including means for generating a first signal on a key switch state detection output whenever said voltage present on the terminal is less than the reference voltage and for generating a second signal on said detection output whenever said voltage present on the terminal is greater than the reference voltage or whenever said amplifier means is regulating.

5 Claims, 2 Drawing Sheets

CIRCUIT FOR DETECTING THE STATE OF A SWITCH, IN PARTICULAR A CAR KEY CONTACT IN A VOLTAGE REGULATOR OF AN ALTERNATOR

The present invention relates in general to voltage regulator devices for charging a battery from an alternator.

BACKGROUND OF THE INVENTION

Conventionally, a regulator is switched ON by a vehicle key (a "car key"). With a so-called "single function" regulator, the regulator is connected to a contact of the car key via a fault warning lamp.

In more sophisticated regulators, the regulator circuitry is permanently under power, but it must switch from a rest or standby state where it consumes little electricity to an active state when it detects that the key contact has closed.

However, to make the wiring of such regulators compatible with single function regulators, it is not possible to provide a direct link between the key contacts and the regulator, which means that contact closure must be detected via the fault warning lamp.

In practice, the central problem of such detection lies in the discrimination that must be performed between the case where the key contact is open and the lamp is off, in which case the lamp terminal connected to the regulator is grounded, and the case where the key contact is closed but the lamp is on because there is a fault, in which case the terminal of the lamp connected to the regulator is at a potential fixed by the voltage drop of the transistor powering said lamp. The smaller this voltage drop the closer the potential of the lamp terminal connected to the regulator is to ground, thereby making it difficult to discriminate between the open and closed states of the key contact.

One known solution is to increase said voltage drop so as to facilitate discrimination by comparison with a suitable voltage threshold, as described below with reference to FIG. 1.

One terminal of a lamp L is connected via the key switch CL to a voltage B+. The other terminal of the lamp is connected firstly to one or more loads, secondly to the negative input of a differential amplifier A, and thirdly to an input of a comparator CP. The positive input of A receives a threshold voltage VS1, e.g. of 0.9 volts. The second input of CP receives a threshold voltage VS2, which is less than VS1, and is 0.7 volts, for example.

The output of A is looped back to its negative input, while the output of CP constitutes the key detection signal.

When the key switch is closed, amplifier A makes it possible to power the lamp to indicate a fault.

The purpose of the amplifier A is to regulate the voltage drop of the transistor to a value of 0.9 volts. This guarantees that when the lamp is on, the voltage at the terminal SL is always close to said value.

Under such conditions, the comparator CP can discriminate reliably between the situation where SL is grounded (key open circuit) and the situation where the key is closed circuit and the lamp is on, in which case SL is at 0.9 volts, which is greater than the 0.7 volt threshold.

However, with such a known circuit, another problem appears when the voltage at the lamp terminal connected to the regulator is taken as a feed voltage for auxiliary loads CA as shown in FIG. 1, which auxiliary loads may include relays, for example. Thus, an increase in the voltage drop runs the risk of causing such relays to stick ON when the voltage drops from a level close to battery voltage B+ (key switch closed and lamp OFF) to said voltage drop value (key switch closed and lamp ON).

This prior art circuit has two other major drawbacks. Firstly by requiring an amplifier and a comparator it is complex and expensive. Secondly, such a circuit is sensitive to the electrical disturbances that act on the regulation performed by the amplifier, and which are detected by the comparator.

The present invention seeks to mitigate these drawbacks of the prior art.

SUMMARY OF THE INVENTION

To this end, the present invention provides a circuit for detecting the state of a switch, in particular the state of a key contact for activating a regulator circuit for regulating the voltage at which a battery is charged by an alternator, in which a first terminal of the key switch is connected to a DC source and a second terminal of the key switch is connected to the regulator circuit via a load such as a warning lamp, said load being switched ON and OFF by means of a component having a voltage drop; wherein the detection circuit comprises amplifier means receiving a reference voltage on a first terminal, and on a second terminal the voltage present on a terminal of the load opposite from its terminal connected to the key switch, the amplifier means being designed to regulate the voltage drop to the value of the reference voltage so long as the key switch and the component having the voltage drop are conductive, and including means for generating a first signal on a key switch state detection output whenever said voltage present on the terminal is less than the reference voltage and for generating a second signal on said detection output whenever said voltage present on the terminal is greater than the reference voltage or whenever said amplifier means is regulating.

BRIEF DESCRIPTION OF THE DRAWINGS

An embodiment of the invention is described by way of example with reference to the accompanying drawings, in which:

FIG. 3 is a detailed circuit diagram of a practical embodiment of the circuit of FIG. 2a.

DETAILED DESCRIPTION

Figure 1:
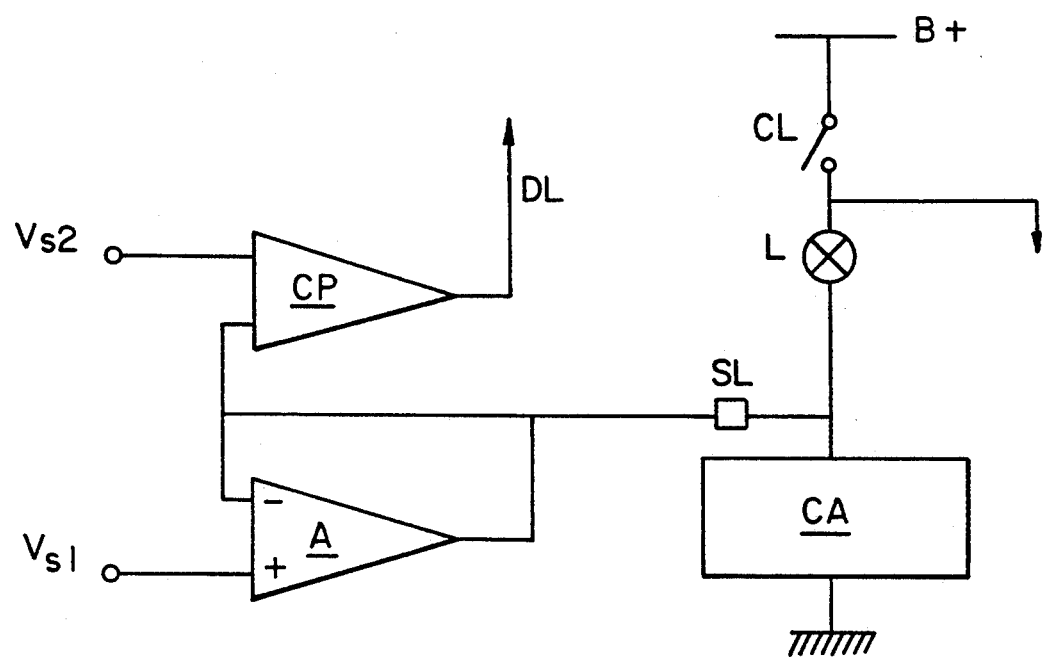
FIG. 1 is a block diagram of a prior art discrimination circuit.
Figure 2:
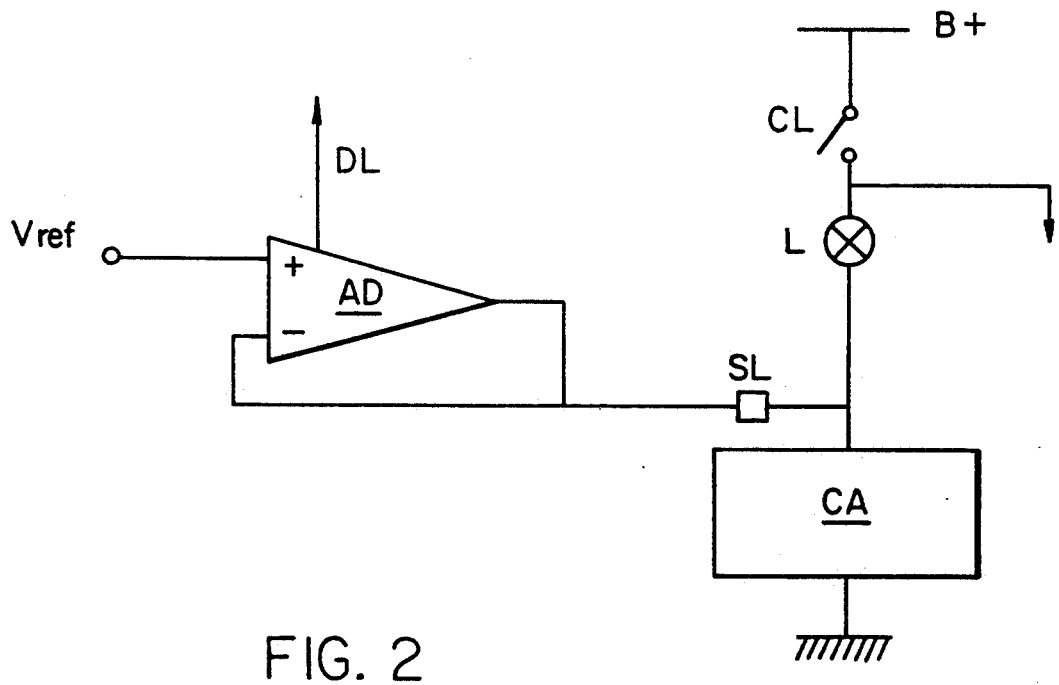
FIG. 2 is a block diagram of a discrimination circuit of the present invention.

With reference initially to FIG. 2, the key CL of a motor vehicle and represented by an ON/OFF switch is connected between the positive terminal of the battery (voltage B+) of the vehicle and a first terminal of a fault indicator lamp L which is conventionally provided on the dashboard of the vehicle and which is associated with a device including an alternator and a regulator for the battery charging voltage provided by the alternator.

The second terminal of the lamp L is connected to a lamp output terminal SL of the regulator. Auxiliary loads CA may be connected between the lamp and ground. The line running from the connection between the key switch and the lamp is for powering other devices or apparatuses in the vehicle when the key is switched ON.

The terminal SL is connected to the negative input of a differential amplifier AD whose output is looped back to said negative input. A reference voltage Vref, e.g. +0.7 volts, is applied to the positive input of AD.

When the key switch is closed, i.e. when it is ON, the amplifier AD makes it possible to power the lamp to indicate a fault.

In addition, as described in greater detail below, the amplifier AD is designed, according to the invention, to deliver a signal on an output DL that is representative of the open or closed state of the key switch CL respectively for switching the regulator to its standby state and to its active state, in application of the following rules:

if the voltage on SL is less than the threshold Vref, then the output DL is inactive (e.g. zero current); this applies when the switch CL is open and SL is connected to ground;

if the voltage on SL is greater than the threshold Vref, the output DL is active (e.g. a current is taken from the terminal DL); this applies when the key switch CL is closed and the lamp is OFF, such that the voltage on SL is then B+; and finally if the amplifier AD is regulating the voltage at the terminal SL to the threshold voltage Vref, then the output DL must also be active; this applies when the key switch CL is closed and the lamp is ON.

Figure 2A:
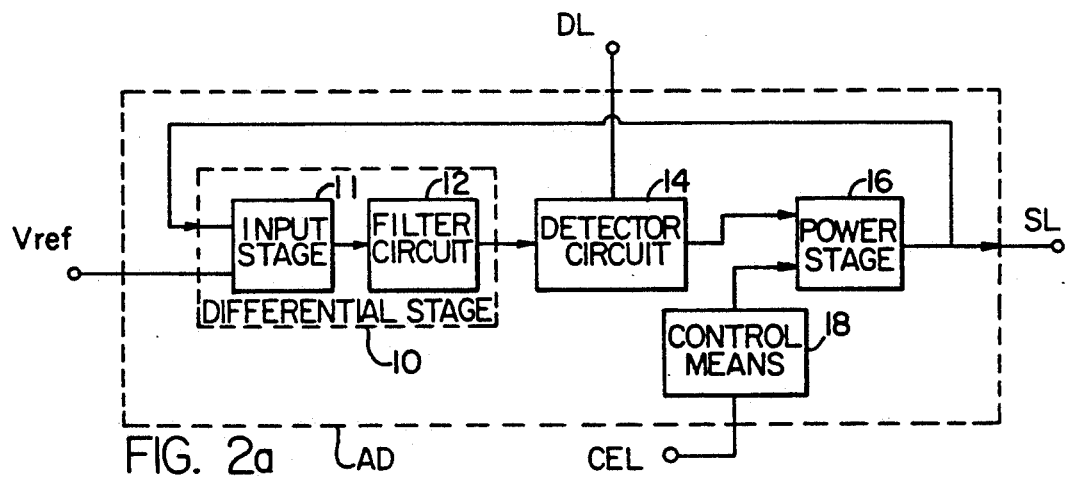
FIG. 2a is a functional block diagram of a portion of the circuit of FIG. 2.

With reference to FIG. 2a, there can be seen a functional block diagram of one embodiment of the amplifier AD of the invention.

It comprises a differential stage 10 having an input stage 11 that receives the reference voltage Vref on one of its inputs. The stage 10 further includes a filter circuit 12 whose output is applied to the input of a detector circuit 14 which includes the detection terminal DL. The output from the detector circuit is connected to a first input of a power stage 16. The power stage is also controlled via a second input by control means 18 responsive to an external signal CEL for switching the lamp ON and OFF. Finally, the output from the power stage 16 is connected firstly to the terminal SL and secondly to another input of the differential stage 10 for regulation purposes.

Figure 3:
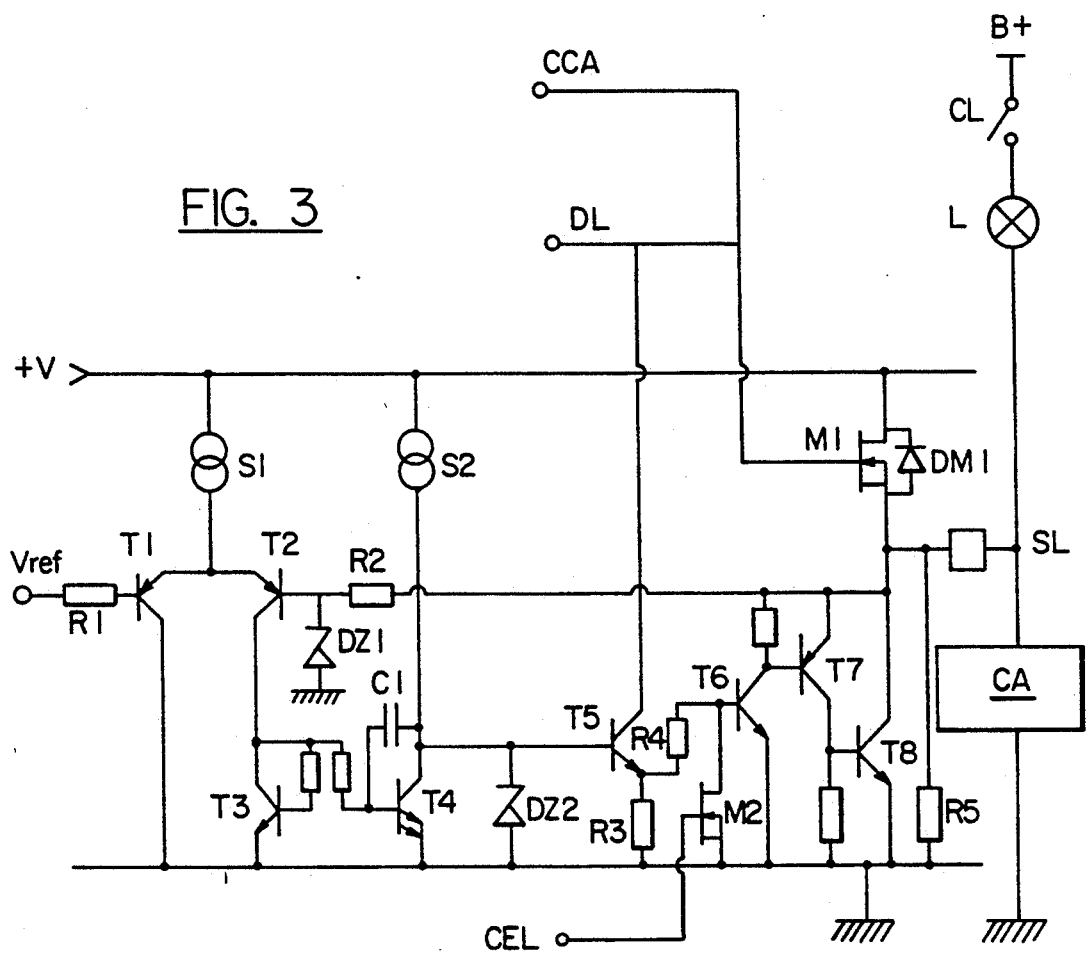

A practical embodiment of a circuit implementing the principles of FIG. 2 is now described in detail with reference to FIG. 3.

The input for a reference voltage Vref, e.g. of 0.7 volts, is applied to the base of a PNP transistor T1 via a resistor R1. The collector of T1 is connected to ground, while its emitter is connected to the emitter of a PNP transistor T2. The two emitters are connected to a constant current source S1.

The base of T2 receives via a resistor R2 the voltage present on the collector of an NPN transistor T8 which is the transistor for controlling the lamp L. A zener diode DZ1 is a protective peak-clipping diode.

T1 and T2 constitute the input stage 11 of the differential stage 10 that is constructed around T1 to T4. The collector of T2 is connected to the filter circuit 12 which is of conventional design and which is constituted by transistors T3 and T4, by a current source S2, and by a capacitor C1.

The output from the filter circuit is applied via a transistor T5 constituting the detector circuit 14 to a power stage 16 constituted by transistors T6 to T8. More precisely, the collector of T4 is connected to the base of T5. A zener diode DZ2 is provided to provide protection by clipping.

The collector of T5 is comeded to a signal output terminal referenced DL for detecting the state of the key contact. The emitter of T5 is connected to an emitter resistor R3 and to the base of T6 via a resistor R4. An MOS transistor M2 is connected between the base of T6 and ground, which transistor constitutes the control means 18 and has its grid connected to a control input terminal CEL for controlling the state of the lamp L.

The collector of T8 is connected to a lamp output terminal SL of the circuit. The lamp L is connected between said terminal SL and the key contact CL. An auxiliary load CA is connected between the terminal SL and ground.

An MOS transistor M1 having a diode DM1 connected between its drain and its source receives on its grid and from a terminal CCA a control signal for switching the auxiliary load CA in and out of circuit.

Finally a resistor R5 connects the terminal SL to ground.

The above-described circuit operates as follows:

a) When the key contact CL is open (as shown), the terminal SL is brought to ground potential via the load(s) CA or, if there is no load, via R5. T2, T3, and T4 then conduct thereby switching OFF T5. The output DL therefore delivers no current which serves to indicate to the remainder of the regulator circuit (not shown) that the key contact is open and that the regulator circuit should therefore be in the standby state.

b) When the key contact is closed and a fault in the regulator is observed (in practice until the engine is started), then the input terminal CEL receives a signal that switches OFF M2. T6 to T8 are conductive and the lamp is switched ON. The voltage at terminal SL is therefore equal to the voltage drop of T8. Under such circumstances, the circuit regulates said voltage on the value of the reference voltage Vref. The conductive state of T6 to T8 causes T5 to be conductive as well when the circuit is operating as a regulator since T5 must supply the base current for T6. More precisely, under these circumstances, the emitter of T5 is at a non-zero voltage induced by the junction voltage of T6 which is in the conductive state. Current therefore flows through R3, through T5 and from the detection terminal DL. DL thus indicates the fact that the key contact is closed, thereby bringing the regulator to the active state.

c) When the key contact CL is closed and no fault is observed in the regulator, then the input terminal CEL receives a signal that causes M2 to conduct. T6, T7, and T8 are thus switched OFF. No current can flow through the lamp and the terminal SL is at the potential B+ as seen through the lamp and the key contact. As a result T2, T3, and T4 are OFF while T5 is saturated. A current thus continues to be generated on output DL to inform the regulator that the key contact is still closed and that the regulator should therefore remain in the active state.

Thus, according to the present invention, the circuit described is suitable for generating appropriate detection signals DL because of a judicious organization of the differential stage T1 to T4, of the power stage T6 to T8, and of the transistor T5 which is sensitive to the state of the differential stage, and this is achieved in a manner that is simpler than the prior art, in particular because only one reference voltage is required. By using only one reference voltage, it is possible to reduce the voltage drop of the transistor that powers the lamp. For example, regulation can be performed on about 0.7 volts, which is to be compared with the value of about 0.9 volts used in the prior art. This minimizes the risk of the relays used for powering auxiliary loads sticking ON undesirably under such circumstances.

It may also be observed in the circuit described above that if the connection to the positive output terminal of the alternator is interrupted (voltage +V), then the regulator continues to be powered at a low voltage, e.g. about 3 volts, via the lamp and the diode DM1, thereby switching ON the lamp to indicate the corresponding fault.

Finally, it may be observed that the discriminator circuit described is particularly suitable for being integrated in a regulator circuit constituted by a single silicon chip.

Naturally, the present invention is not limited in any way to the embodiment described above and shown in the drawings, and the person skilled in the art will be able to make any variants or modifications that come within the spirit of the invention.

We claim:

1. In a circuit for regulating the voltage at which a battery is charged by an alternator, said circuit being capable of activation by a key switch wherein a first terminal of the key switch is connected to a DC source and a second terminal of the key switch is connected to said regulator circuit through a load such as a warning lamp, and a component having a voltage drop being provided for switching said load ON and OFF, a circuit for detecting the open or closed state of said key switch including:

amplifier means receiving on a first terminal a fixed reference voltage and on a second terminal the voltage present on the terminal of the load opposite to its terminal connected to said key switch, said amplifier means being adapted for regulating said voltage drop to the value of the reference voltage as long as said key switch and said component having a voltage drop are conductive, and means for generating a first signal on a key switch detection output whenever said voltage present on the terminal of the load opposite to its terminal connected to said key switch is less than the reference voltage, and for generating a second signal on said detection output whenever said voltage present on the terminal of the load opposite to its terminal connected to said key switch is greater than the reference voltage, or whenever said amplifier means is in the course of regulating said voltage drop.

2. A circuit according to claim 1, wherein the amplifier means comprises:

a differential stage receiving the reference voltage on a first terminal and, on a second terminal, the voltage present on the said terminal of the load;

a power stage including said component having a voltage drop and connected to the output of said differential stage for the purpose of regulating the voltage drop;

a detector circuit interposed between the differential stage and the power stage and controlled to conduct by the output of said differential stage, the detector output being taken from said detector circuit; and control means for controlling said power stage from a signal for switching the load ON and OFF.

3. A circuit according to claim 2, wherein the detector circuit comprises a transistor whose base is connected to the output of the differential stage and whose emitter is connected firstly to ground potential via a first resistor and secondly to the base of a first transistor of the power stage via a second resistor.

4. A circuit according to claim 2, wherein the control means for said power stage comprise semiconductor switch means disposed between the base of said first transistor of the power stage and ground potential.

5. A regulator for regulating the voltage at which a battery is charged by an alternator, wherein the regulator includes a detector circuit according to claim 1.

* * * * *